Aug. 28, 1934. H. J. GOOSMAN Re. 19,290

ELECTRICALLY LIGHTED FLOOR CLEANER

Original Filed Dec. 10, 1931 2 Sheets-Sheet 1

Inventor

Herbert J. Goosman.

Witness:

John H. Cave

By Henry J. Miller

Attorney

Aug. 28, 1934. H. J. GOOSMAN Re. 19,290

ELECTRICALLY LIGHTED FLOOR CLEANER

Original Filed Dec. 10, 1931 2 Sheets-Sheet 2

Inventor
Herbert J. Goosman.

By Henry J. Miller
Attorney

Witness:
John H. Cave

Reissued Aug. 28, 1934

Re. 19,290

UNITED STATES PATENT OFFICE 19,290

ELECTRICALLY LIGHTED FLOOR CLEANER

Herbert J. Goosman, Elizabeth, N. J., assignor to The Singer Manufacturing Company, Elizabeth, N. J., a corporation of New Jersey Original No. 1,917,761, dated July 11, 1933, Serial No. 580,064, December 10, 1931. Application for reissue June 13, 1934, Serial No. 730,482

7 Claims. (Cl. 240—2)

This invention relates to vacuum cleaners of the usual household floor-cleaning type embodying a motor-driven fan, suction-nozzle and dust-bag assembly to which is pivotally connected a handle for propelling the cleaner over the floor.

The present invention has for an object to provide such a vacuum cleaner with a lighting device which is so arranged and combined with the cleaner as to adequately illuminate the nozzle and the floor area adjacent thereto. Another object of the invention is to provide a vacuum cleaner with a lighting device which does not add to the overall height of the cleaner or constitute such a protuberance as to interfere with the use of the cleaner in corners, under beds, or around the legs of tables, chairs, or other articles of furniture.

Another object of the invention is to provide a vacuum cleaner with a lighting device which is well protected against damage by collision, or by a falling body or other cause.

A further object of the invention is to provide the device with a suitable reflector.

Still further, the invention has for an object to provide a vacuum cleaner with a lighting device which is simple in construction, easy and inexpensive to manufacture and assemble, and which is a material aid to the efficient use of the cleaner under conditions where natural or other general illumination is inadequate.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figures 1, 2:
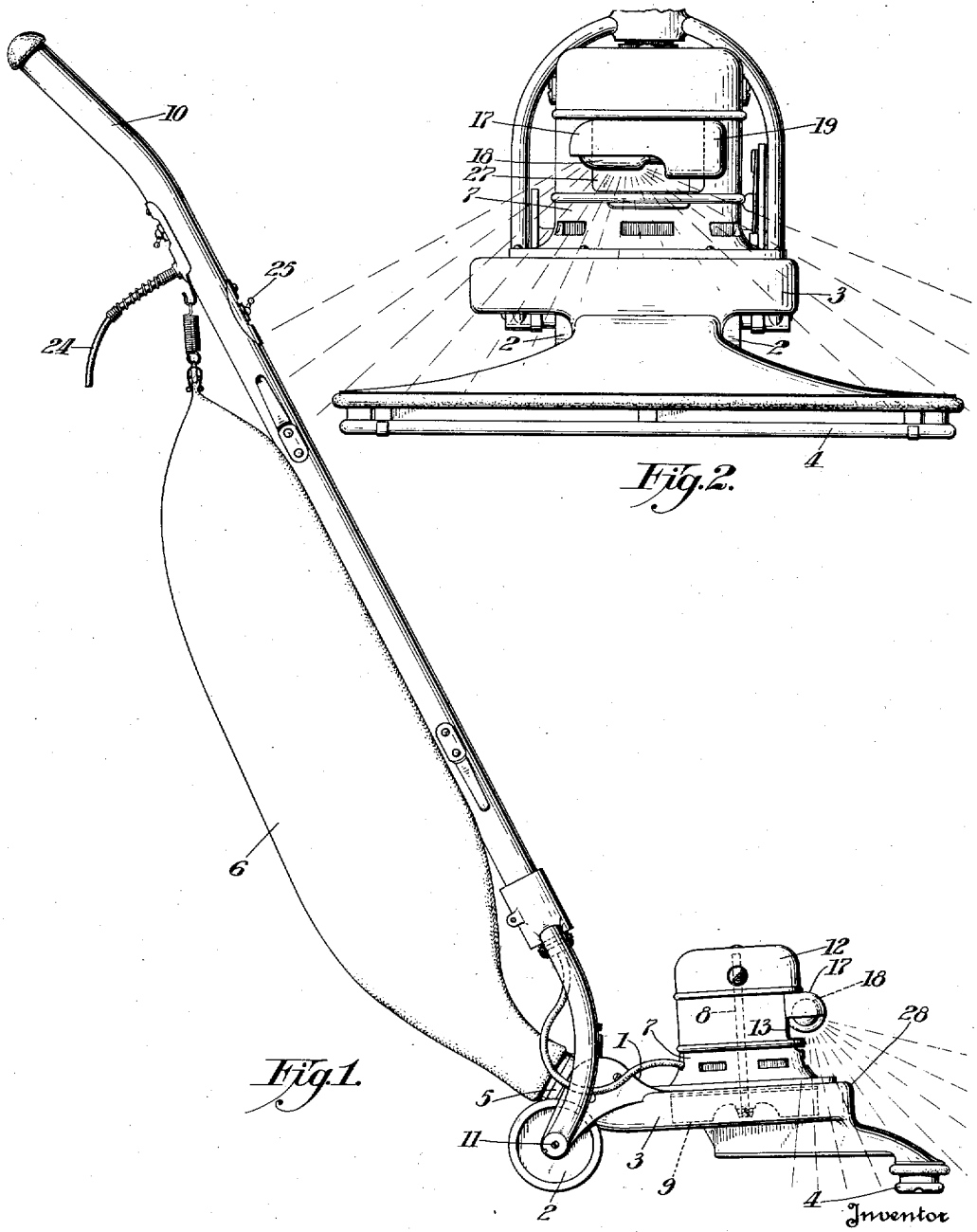
Figure 4:
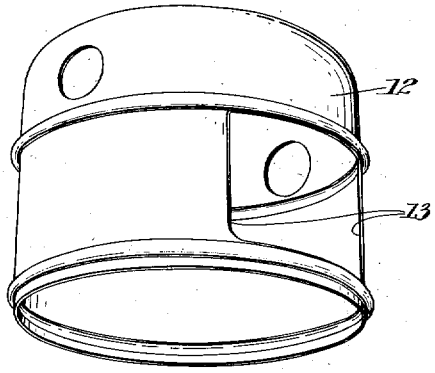
Figure 5:
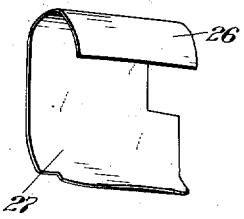
Figure 3:
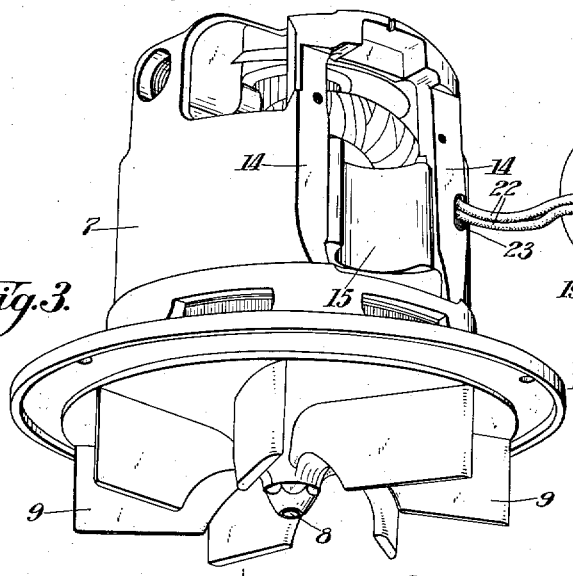
Figure 7:
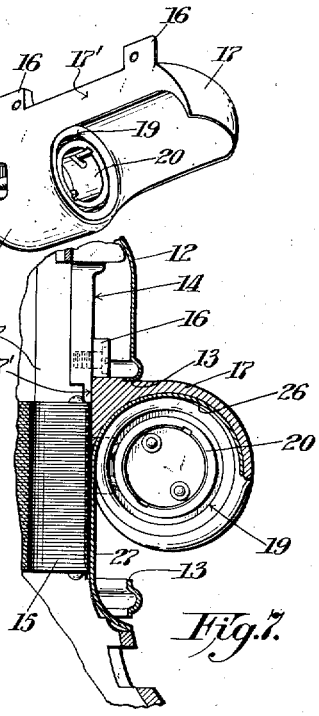
Figure 6:
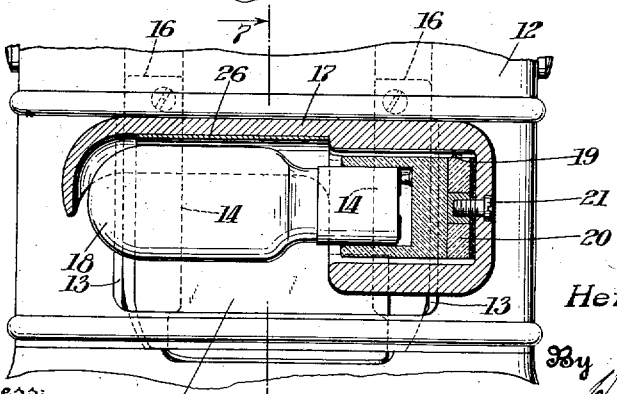

Fig. 1 is a side elevation of a domestic electric floor-type suction-cleaner embodying the invention. Fig. 2 is a front elevation of the cleaner-frame and nozzle. Fig. 3 is a perspective view of the fan-motor removed from the fan-casing and showing the lamp-guard detached from the motor-frame. Fig. 4 is a perspective view of the motor-casing. Fig. 5 is a perspective view of the reflector. Fig. 6 is a vertical longitudinal section through the lighting device, and Fig. 7 is a section on the line 7—7, Fig. 6, with the lamp-bulb removed to show the lamp-base receptacle.

1 represents the ambulant frame of the cleaner which is mounted on wheels 2 and includes the fan-casing 3 having the down-turned suction-nozzle 4 and dust-discharge pipe 5 to which is connected the dust-bag 6. Mounted on the fan-casing 3 is the fan-motor including the motor-frame 7 in which is journaled a fan-shaft 8 carrying the fan-blades 9. The usual tubular propelling handle 10 is pivotally connected at 11 to the frame 1. The motor includes the upright cylindrical motor-frame-enclosing casing 12 which is formed in the front side of its cylindrical wall with an opening 13 in the form of an outwardly convex window exposing the recessed or flattened portions 14 of the motor-frame 7 between which is the recessed motor-field frame-portion 15.

Screwed to the flat seats 14 are the upstanding feet 16 of the tubular lamp-guard 17 of heavy-walled cast-metal construction. The lamp-guard 17 is cut away at its under side to provide an inverted trough-shaped protecting hood for the tubular lamp-bulb 18 and is closed at one end to provide a cylindrical chamber 19 in which the usual lamp-base receptacle 20 is secured by the screw 21. The guard-body 17 is provided at one side with a flat vertical seat 17′ to fit against the flat seats 14 of the motor-frame; the attaching feet 16 constituting continuations of the seat 17′. The current-supply circuit wires 22 for the lamp-receptacle 20 may pass into the motor-frame 7 through the aperture 23 and may be connected in any desired manner to the usual current-supply cord 24, the lamp being preferably controlled by a suitable switch 25 on the handle 10.

A polished sheet-metal reflecting liner 26 is fitted to the inner face of the hooded portion of the lamp-guard 17. The reflector 26 has a depending apron extension 27 adjacent the motor-frame 7 and below the guard 17.

The lamp is thus disposed entirely within the vertical dimension or height of the motor-body and does not add to the overall height of the cleaner. It is also well in rear of the cleaner-nozzle 4 and the shoulder 28 of the fan-casing, where it is protected from collision. The heavy and substantial hooded construction of the guard 17 further protects the lamp 18 from damage by collision or by a falling body.

By recessing the motor and disposing the lighting device partially within such recess, there is secured a desirable sturdiness of construction and freedom from interfering protuberances of any kind. The light is, as it were, a built-in light and not an annoying attachment. The horizontal disposition of the tubular lighting device and its partial reception in the tangentially recessed cylindrical motor also contribute to the desirable results above pointed out.

Further, by recessing the light reflector in the front wall of a vertically arranged cylindrical motor-frame so that light is directed outwardly through the window 13 from radiating or reflecting means in such recess there is secured the advantages of maximum compactness with minimum protuberance of the lighting device and with maximum lateral spread or lateral distribution of the light rays as well as frontal distribution.

Having thus set forth the nature of the invention, what I claim herein is:—

1. A domestic floor cleaner comprising an electric motor having a cylindrical frame with its longitudinal axis upright and an upright motor shaft journaled therein and coaxially therewith, the cylindrical contour of said motor frame being externally recessed at the front side of said motor, casing means encompassing the motor-frame and having a window in its front side in register with the recessed portion of the motor-frame, an ambulant motor-driven suction device carrying said motor and including a forwardly extending suction nozzle, a light reflector disposed at least partially within said window and at least partially within the cylindrical contour of the motor-frame at the recess therein, and an electric light on said cleaner closely adjacent said reflector.

2. A domestic floor cleaner having an ambulant wheeled frame including a fan-casing and a forwardly extending and down-turned suction nozzle, an electric motor having a motor-frame, a fan-shaft journaled in said motor-frame with its axis upright, a suction-fan mounted on the lower end of said fan-shaft within said fan-casing, a casing encompassing the motor-frame and having a convex window at the front of said motor and above and in rear of said suction nozzle, a light reflector disposed at least partially within said convex window, and an electric light carried by said cleaner closely in front of said reflector.

3. A domestic floor cleaner comprising an electric motor having a cylindrical frame with its axis upright and a motor shaft journaled therein, said cylindrical frame having a recess in its front side, casing means encompassing the motor-frame and having a convex window in its front side in register with said motor-frame recess, an ambulant motor-driven suction device carrying said motor and including a forwardly extending suction nozzle, a light reflector received at least partially within said convex window and at least partially within the cylindrical contour of the motor-frame at the recess therein, and an electric light on said cleaner closely in front of said reflector.

4. The combination with a suction-cleaner fan-motor of upright cylindrical form having a recess in its cylindrical wall, of an inverted open trough-shaped lamp-guard mounted in said recess and having one end closed to form a cylindrical chamber, and a lamp-base-receptacle mounted in said chamber.

5. The combination with a suction cleaner fan-motor of upright cylindrical form having a recess in its cylindrical wall, of an open trough-shaped lamp-guard mounted in said recess and having one end closed to form a cylindrical chamber, a lamp-base receptacle mounted in said chamber, and a sheet metal reflecting liner disposed in the open trough portion of said lamp-guard and having an apron extension disposed in said recess below said guard.

6. The combination with a domestic type ambulant suction floor-cleaner including a wheeled fan-casing having a downturned transversely elongated suction-nozzle and a dust-discharge pipe, and a suction fan-motor superimposed upon and carried by said fan-casing and formed in its front side below its top with a recess, of an electric lighting device mounted on said fan-motor below the top of the latter and above the fan-casing and partially received in said recess, said lighting device including an inverted trough-shaped lamp-guard having at one end a cylindrical chamber, a lamp-base receptacle received in said chamber, and a lamp-bulb disposed within said guard.

7. A domestic floor-cleaner having an ambulant wheeled frame including a fan-casing formed with a downturned suction-nozzle, an electric motor mounted on said fan-casing and comprising a motor-frame having a recess, a fan-shaft journaled in said motor-frame, and a casing surrounding said motor-frame and having an opening in register with said recess, and an electric lighting device mounted in said recess upon the motor-frame through the opening in said casing.

HERBERT J. GOOSMAN.